Aug. 2, 1960

S. A. DAVIS 2,947,933

INDUCTION GENERATOR TACHOMETER

Filed June 6, 1958

INVENTOR
SIDNEY A. DAVIS
BY
ATTORNEYS

# United States Patent Office 2,947,933
Patented Aug. 2, 1960

2,947,933

INDUCTION GENERATOR TACHOMETER

Sidney A. Davis, East Norwich, N.Y., assignor, by mesne assignments, to Eastern Air Devices, Inc., Dover, N.H., a corporation of Delaware Filed June 6, 1958, Ser. No. 740,291

19 Claims. (Cl. 322—47)

The present invention relates to the design of induction generator tachometers and the systems in which they are used in order to eliminate or minimize certain troublesome errors to which these devices are subject.

An induction generator tachometer is a device similar to a two-phase induction motor but in which only one of the phases is energized by alternating current. A voltage is induced in the other winding the magnitude of which is determined by the speed of rotation of the rotor. A general description of this type of device and a fairly detailed analysis of the types of errors which are present in such devices is to be found in my article entitled "Performance Characteristics of the Induction Generator Tachometer," published in the January 1953 issue of "Product Engineering."

Ideally no voltage should be induced in the second winding when the rotor is stationary and the voltage induced in the second winding should be linearly proportional to the speed of rotation of the rotor. However, true linearity in the relationship between output voltage and speed of rotor rotation does not obtain because of the leakage reactance and resistance of the primary or A.C. energized winding, and sometimes because of rotor leakage. Departure from linearity (non-linearity) represents an error which limits the useability of these devices.

This invention is directed primarily to the elimination or minimization of the non-linearity error in devices of this type, and, when desired, to the achievement of this result while at the same time producing an output which is at or close to the maximum value which can be obtained. According to one approach here disclosed, only the in-phase components of the output current are considered. This is permissible, since the quadrature errors can be compensated for or corrected in known ways independent with the teachings herein set forth. However, means are also here disclosed for eliminating non-linearity of the output with respect to rotor speed while at the same time preventing the occurrence of quadrature errors, and in certain instances this can even be accomplished at the same time that the magnitude of the output is maximized.

By a proper analysis of the circuitry involved in an induction generator tachometer, and by the proper design of that generator and the appropriate selection of circuit elements which can be incorporated thereinto or used in conjunction therewith, the errors of the type set forth above can be minimized or entirely eliminated. Moreover, these effects can be obtained quite simply, without giving rise to any manufacturing problems, and without adding in any appreciable degree to the expense of the device or of the circuitry associated therewith.

The circuit analysis which follows will set forth certain relationships which should exist as regards various of the parts of the device in order to obtain the desired minimization of the errors involved. These relationships can be satisfied either by simple modifications of the tachometer structure, generally involving the use of known materials in the rotor to produce an optimum value of rotor resistance, or by the addition to the primary circuit of simple components (resistors or capacitors).

In accordance with the above, and to such other objects as may hereinafter appear, the present invention relates to the design of induction generator tachometers and the systems in which they are used, as defined in the appended claims and as described in this specification, taken together with the accompanying drawings, in which:

Figure 1:
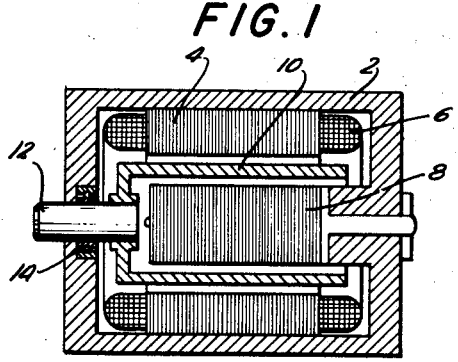
Fig. 1 is an idealized cross sectional view of a drag-cup type of induction generator tachometer.
Figure 2:
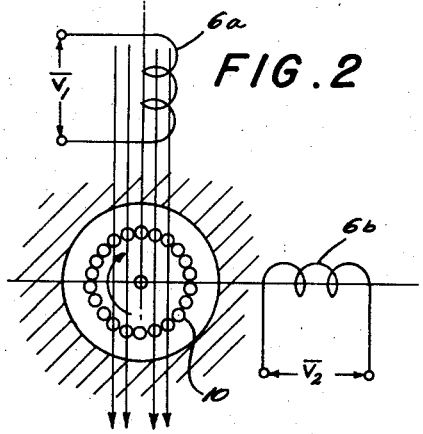
Fig. 2 is a schematic diagram of an induction generator tachometer, the rotor being shown as of the squirrel cage type.

The usual type of drag cup induction generator tachometer comprises, as shown in Fig. 1, a casing 2 within which a magnetically permeable stator 4 is mounted, that stator having poles on which the windings 6 are wound. Positioned inside the stator 4 is a second magnetically permeable stator portion 8. The rotor 10 is constituted by a cup formed of appropriate conductive material to which shaft 12 is secured, that shaft being rotatively journaled in the casing 2 as by means of the bearing 14. As may be seen from reference to Fig. 2, the windings 6 are constituted by primary winding 6a and secondary winding 6b disposed in quadrature relationship. The primary winding 6a is adapted to be energized by a suitable source of alternating current designated $V_1$. Under normal conditions, with the rotor 10 stationary, no voltage will be induced in the secondary winding 6b. However, when the rotor 10 is rotated the moving rotor will cause a distortion of the flux within the generator so that some of that flux will become linked with the secondary winding 6b and generate an alternating voltage therein, designated $V_2$. The degree of flux distortion will be determined by the speed at which the rotor 10 is rotated, and thus the magnitude of the voltage $V_2$ generated at the secondary winding 6b will be determined by that speed of rotor rotation. In order for the voltage $V_2$ to be an accurate measure of the speed of rotor rotation it is desirable that it be accurately and directly proportional thereto, that is to say, that the voltage output $V_2$ be accurately linearly related to the speed of rotation of the rotor 10. This is true whether the rotor be of the drag cup type specifically shown in Fig. 1 or of the squirrel cage type schematically represented in Fig. 2.

Figure 3:
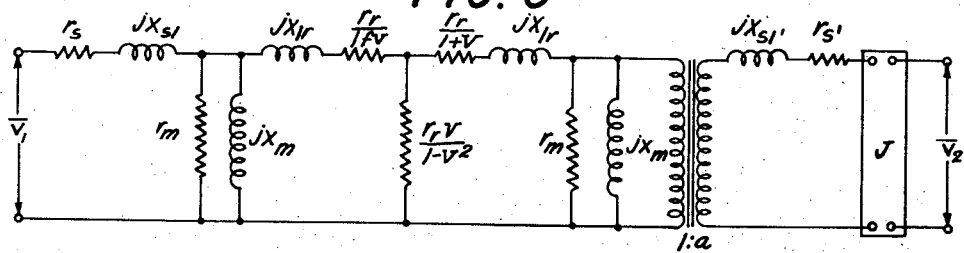
Fig. 3 is a complete equivalent circuit of an induction generator tachometer.
Figure 4:
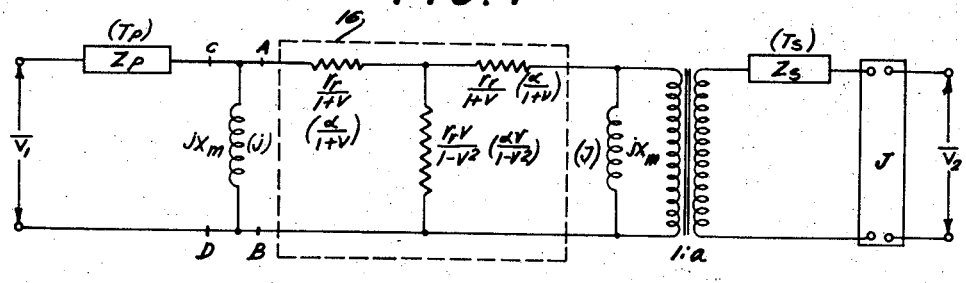
Fig. 4 is a simplified equivalent circuit of a drag cup type induction generator tachometer.

Fig. 3 represents an equivalent circuit of an induction tachometer generator. In that circuit $r_s$ represents the resistance of the primary winding 6a, $jX_{sl}$ represents the leakage reactance of the primary winding, $r_m$ represents the core loss, $jX_m$ represents the shunting impedance of the primary winding, $jX_{lr}$ represents the rotor leakage, $r_r$ represents the equivalent rotor resistance, $jX_{sl}'$ represents the leakage reactance of the secondary winding, $r_s'$ represents the resistance of the secondary winding, $v$ represents the ratio of the actual speed of rotation of the rotor to the synchronous speed of rotation thereof, $a$ represents the ratio of secondary effective turns to primary effective turns and J represents circuitry to provide for a 90 degree phase shift. This circuit may be simplified to that shown in Fig. 4 by disregarding the rotor leakage $X_{lr}$ and the core loss $r_m$. When drag cup type tachometers are involved this simplification is entirely admissible, and no significant error in calculation will result, since those characteristics of the drag-cup device may be considered negligible. When squirrel cage rotors are involved this simplification may introduce an error, but the circuit analysis which follows, based upon the simplified circuit diagram of Fig. 4, will nevertheless give rise to results with a squirrel cage rotor which, while not perfect, are nevertheless superior to the results previously obtained without regard to these calculations. In Fig. 4 the circuit elements included within the box 16 constitute the rotor of the device, and the symbols $Z_p$ and $Z_s$ represent the impedances of the primary and secondary windings $6a$ and $6b$ respectively.

The circuit elements shown in Fig. 4 may be represented on a dimensionless basis, the various symbols for this dimensionless analysis being shown on Fig. 4 in parenthesis. T, representing the dimensionless primary or secondary leakage impedance, equalling $T_r + jT_x$ (where $$T_r = \frac{r_s}{X_m} \text{ and } T_x = \frac{X_s l}{X_m}$$

for the primary winding). $\alpha$ represents the dimensionless cup resistance and is equal to $$\frac{r_r}{X_m}$$

The apparent rotor input impedance, as viewed looking to the right from points A, B in Fig. 4, is $$\frac{\alpha(\alpha+j)}{\alpha+j-jv^2} \quad (1)$$

The total primary shunt impedance, as viewed looking to the right from the points C, D in Fig. 4 can be represented by the following formula:

$$\frac{j\alpha(\alpha+j)}{(\alpha+j)^2+v^2} \quad (2)$$

It will be noted that both the apparent input impedance and the total primary shunt impedance are dependent upon $v$, which is determined by the speed of rotation of the rotor. Since the impedance looking into the rotor circuit will therefore normally vary with the speed of the rotor rotation, it follows that under ordinary circumstances the tachometer will tend to draw a variable current as its speed increases. This variable current passing through the leakage impedance of the primary will cause a voltage drop which will also vary with rotor speed, thereby changing the voltage across the shunting air gap reactance of the primary. Thus variation of speed gives rise to that non-linearity of voltage output with speed which it is the objective of the present invention to eliminate.

The gain K of the primary and rotor circuits, that is to say, the relationship between the voltage across the points A, B and the voltage $V_1$ in Fig. 4, may be represented as follows:

$$K = \frac{\frac{j\alpha(\alpha+j)}{(\alpha+j)^2+v^2}}{\frac{j\alpha(\alpha+j)}{(\alpha+j)^2+v^2} + T_p} \quad (3)$$

This in turn reduces to the following relationship:

$$K = \frac{j\alpha(\alpha+j)}{j\alpha(\alpha+j) + T_p(\alpha+j)^2 + T_p v^2} \quad (4)$$

Substituting for $T_p$ the appropriate values of $T_r$ and $T_x$, this relationship in turn may be expressed as follows:

$$K = \frac{-\alpha+j\alpha^2}{(-\alpha+\alpha^2 T_r - T_r - 2\alpha T_x + T_r v^2) + j(\alpha^2 + 2\alpha T_r + \alpha^2 T_x - T_x + T_x v^2)} \quad (5)$$

It will be noted that only the denominator of the above formula is rotor speed sensitive, since it is only in that denominator that $v$ appears. If a relationship can be derived which makes the denominator independent of $v$, then it follows that the non-linearity effect will be eliminated if that relationship is satisfied.

The denominator, D, of K may be expressed as follows:

$$D = (-\alpha + \alpha^2 T_r - T_r - 2\alpha T_x + T_r v^2) \\ + j(\alpha^2 + 2\alpha T_r + \alpha^2 T_x - T_x + T_x v^2) \quad (6)$$

If D is squared (as I prefer to do for simplification of calculation), and disregarding phase, since we are at this point interested only in the magnitude errors, the following relationship results:

$$D^2 = (-\alpha + \alpha^2 T_r - T_r - 2\alpha T_x + T_r v^2)^2 \\ + (\alpha^2 + 2\alpha T_r + \alpha^2 T_x - T_x + T_x v^2)^2 \quad (7)$$

If $\gamma$ and $\delta$ are used to denote all of the portions of the above relationship in the first and second parts thereof respectively except for those elements which include $v$, then $$D^2 = (\gamma + T_r v^2)^2 + (\gamma + T_x v^2)^2 \quad (8)$$

Differentiating $D^2$ with respect to $v^2$ we get:

$$\frac{dD^2}{d(v^2)} = 2(\gamma + T_r v^2) T_r + 2(\delta + T_x v^2) T_x \quad (9)$$

If now this differentiation is set equal to zero and is solved, we get:

$$\gamma T_r + T_r^2 v^2 + \delta T_x + T_x^2 v^2 = 0 \quad (10)$$

If we now let $V = 0$, which is an admissible working hypothesis, since all good tachometers are designed for operation as speeds far below synchronous speed, Equation 10 reduces to:

$$\gamma T_r = -\delta T_x \quad (11)$$

Substituting the initial values for $\gamma$ and $\delta$ the following relationship is obtained:

$$(\alpha^2 - 1)(T_r^2 + T_x^2) = \alpha(T_r - \alpha T_x) \quad (12)$$

This relationship is one which will, insofar as the magnitude of the output is concerned, and disregarding quadrature errors, give rise to a mode of operation in which the voltage output V2 is directly and linearly proportional to the speed of rotor rotation.

It will be noted that there are three variables in that relationship, to wit, $T_r$, $T_x$ and $\alpha$. $T_r$ and $T_x$ can be varied by connecting appropriate resistors or capacitors in series with the primary winding $6a$, the addition of a resistor increasing the value of $T_r$ and the addition of a capacitor decreasing the value of $T_x$. The other variable, $\alpha$, is determined by the resistive value of the rotor, and may also be varied through the choice of appropriate materials therefor.

Figure 5:
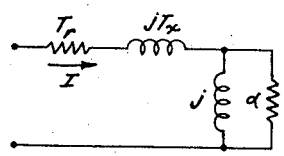
Fig. 5 is an equivalent circuit used in calculating primary circuit parameters for conditions when the rotor is stationary.

It is also possible to eliminate magnitude non-linearity while at the same time obtaining substantially maximum output from the secondary winding $6b$. It can be shown that maximum tachometer output occurs when $\alpha=1$, from the following reasoning: The tachometer voltage gradient is proportional to the torque/watt of the unit used as a motor. The equivalent circuit for one phase of the unit used as a motor, at low speeds relative to synchronous speed (which is the usual condition at which these generators are operated) is set forth in Fig. 5. Assuming a given current input I to the circuit of Fig. 5, the current in $\alpha$ is $$I\frac{j}{j+\alpha}$$

the power in $\alpha$ is $$\frac{I^2\alpha}{1+\alpha^2}$$

the power in $T_r$ is $I^2T_r$ and thus the total power is $$I^2\left(T_r + \frac{\alpha}{1+\alpha^2}\right)$$

The torque is proportional to the power in $\alpha$, and may be represented as follows:

$$T = \frac{kI^2\alpha}{1+\alpha^2}$$

The torque/watt $m$ therefore equals $$\frac{k\alpha}{T_r(1+\alpha^2)+\alpha}$$

To find the maximum value for $m$, $m$ is differentiated with respect to $\alpha$ and set equal to zero. A solution of that equation shows that $\alpha = 1$.

The conventional copper-manganese alloy usually used for the drag cups 10 gives rise to an $\alpha$ of 2.5, but an $\alpha$ of 1 can be achieved in many instances by forming the cup 10 of an aluminum alloy.

For the special case where $\alpha = 1$, relationship (12) for eliminating in-phase linearity error simplifies to the very simple relationship:

$$T_r = T_x \quad (13)$$

If phase shift errors are not to be ignored, it is known that a zero phase shift error is obtained when the following relationship exists:

$$T_r = \frac{\alpha}{\alpha^2 - 1}(1 + 2T_x) \quad (14)$$

This relationship, as well as relationship (12) for linearity of the in-phase signal, can be simultaneously achieved if $T_x = 0$. In such a case $$T_r = \frac{\alpha}{\alpha^2 - 1} \quad (15)$$

$T_x$ may be brought to zero by connecting a capacitor of appropriate value in series with the primary winding 6a, and, for a given $\alpha$, $T_r$ may be brought to its desired value by connecting a resistance in series with the primary winding 6a.

It will be seen from the above that in the special case where $\alpha = 1$ (which, as has been shown, is the condition for maximum in-phase output)

$$T_r = \infty \quad (16)$$

If, in addition, $T_x = 0$, all three of the desired results—linearity of output, zero phase shift, and maximum output—are simultaneously obtained. This situation can be brought about by driving the primary winding 6a from an infinite impedance source. There are many known ways in which that can be done. The primary winding 6a can be connected for push pull operation driven by an amplifier having a twin pentode output stage and having precise gain. A very large dropping resistor can be interposed between the energizing source and the primary winding, which resistor will consume much more power than will the tachometer. An amplifier employing current feedback could be used to energize the primary winding 6a, such an amplifier giving an output current proportional to input voltage and therefore acting like a very high impedance current source. This exposition is merely exemplary, and many modes of achieving this result will be apparent.

From the above analysis it will be seen that a series of novel relationships have been developed to achieve the desired results. These may be designated as A, B, C and D and are as follows:

A—General expression for elimination of in-phase non-linearity:

$$(\alpha^2 - 1)(T_r^2 + T_x^2) = \alpha(T_r - \alpha T_x) \quad (12)$$

B—In-phase non-linearity eliminated and maximum in-phase output obtained:

$$\alpha = 1; \quad T_r = T_x \quad (13)$$

C—In-phase non-linearity eliminated and phase shift error eliminated:

$$T_x = 0; \quad T_r = \frac{\alpha}{\alpha^2 - 1} \quad (15)$$

D—In-phase non-linearity eliminated, phase shift error eliminated, and maximum in-phase output obtained:

$$\alpha = 1; \quad T_x = 0; \quad T_r = \infty \quad (16)$$

The above analysis represents an approach to the problem of eliminating errors in devices of the type under discussion in which the various errors are balanced against one another in such a manner as to produce the desired end result. This contrasts with the conventional approach which attempts to minimize each of the error components individually.

Considering relationship A, it will be seen that for a variety of values for $\alpha$ (which is determined by the rotor resistance) there are corresponding sets of values of the leakage impedance parameters which will give the desired condition. In some cases $T_x$, the reactive portion of the leakage impedance, may have to be negative. This can be achieved by using a capacitor of appropriate magnitude in series with the primary winding 6a. In some instances $T_r$, the resistive portion of the leakage impedance, may have to be negative. This result can be achieved by driving the primary winding 6a through an electronic amplifier.

To illustrate the manner in which these relationships may be achieved, a few specific examples are set forth. A drag cup induction generator tachometer, as manufactured for 400 c.p.s. operation, may have a primary winding resistance $r_s$ of 100 ohms, a primary winding leakage reactance $X_{s1}$ of 100 ohms, a primary winding shunting impedance $X_m$ of 400 ohms, and an equivalent drag cup resistance $r_r$ of 1000 ohms. As a result $T_r = \frac{1}{4}$, $T_x = \frac{1}{4}$ and $\alpha = 2.5$.

With this particular example, in which $T_r$ already equals $T_x$, non-linearity can be eliminated and maximum output simultaneously obtained merely by changing $\alpha$ from 2.5 to 1. One way in which this can be accomplished is by utilizing an aluminum alloy for the drag cup 10.

If the tachometer originally had had a primary leakage reactance $X_{s1}$ of 200 ohms, the necessary equality between $T_r$ and $T_x$ could be obtained (once $\alpha$ has been brought to the value of 1), either by increasing $T_r$ by adding an additional 100 ohm resistance in series with the primary winding 6a or by reducing $T_x$ by connecting a 4 mfd. capacitor in series with the primary winding 6a, such a capacitor having a negative reactance at 400 c.p.s. of 100 ohms.

If zero phase shift error is of importance, and with a drag cup 10 formed of a copper manganese alloy so that $\alpha = 2.5$, zero phase shift error and non-linearity can both be eliminated by connecting a 4 mfd. capacitor in series with the primary winding 6a, thus making $T_x = 0$. Substituting a value of 2.5 into the equation for $T_r$ we find that $T_r$ should equal .477. Resistance is then added in series with the primary winding 6a so that the sum of the winding resistance and the added resistance equals 190.8 ohms (.477 × 400).

By the novel approach to the design of induction tachometers as above set forth it is seen that several of the most troublesome errors to which these devices are subject can be eliminated through proper design of the units and of the systems in which they are employed so that the relationships above set forth will obtain. This can be done in an uncomplicated and reliable manner. For linearity the connection of a resistor or capacitor of appropriate value in series with the primary winding 6a will achieve the desired result. For maximum output the internal design of the rotor can be modified, as through the use of appropriate materials. Zero phase shift error and linearity can be simultaneously obtained in many cases, and maximum output can also be obtained at the same time through the use of appropriate driving circuitry.

When the above teachings are carried out the operation of the tachometer with the specified errors eliminated or minimized is not particularly temperature sensitive, and the desired results will be obtained over a band of temperatures in the vicinity of the nominal temperature at which the parameters are set. This is satisfactory in many installations. Insensitivity to temperature changes is particularly marked when $\alpha=1$. The same situation obtains with respect to sensitivity to small changes in the frequency of the energizing current. Indeed, when a series capacitor is included in the primary circuit for the purposes above set forth, a greater degree of insensitivity to line frequency variation is obtained than would otherwise be the case. Thus carrying out my teachings through the use of such a series capacitor has this additional desirable effect.

While but a few specific embodiments of the present invention have been set forth above, it will be apparent that my invention is not limited thereto, but is of a general and broad nature as defined in the following claims.

I claim:

1. An induction tachometer comprising a primary circuit, a secondary circuit, and a rotor operatively connected to said circuits, in which the following relationships exist:

$$(\alpha^2-1)(T_r^2+T_x^2)=\alpha(T_r-\alpha T_x)$$

$\alpha$ representing the ratio between the rotor resistance and the shunting impedance of the primary circuit, and $T_r$ and $T_x$ representing the ratios between the resistance and reactance respectively of the primary circuit as numerator and the shunting impedance of the primary circuit as denominator.

2. An induction tachometer comprising a primary circuit, a secondary circuit, and a rotor operatively connected to said circuits, in which the following relationships exist:

$$\alpha=1 \text{ and } T_r=T_x$$

$\alpha$ representing the ratio between the rotor resistance and the shunting impedance of the primary circuit, $T_r$ and $T_x$ representing the ratios between the resistance and reactance respectively of the primary circuit as numerator and the shunting impedance of the primary circuit as denominator.

3. An induction tachometer comprising a primary circuit, a secondary circuit, and a rotor operatively connected to said circuits, in which the following relationships exist:

$$T_x=0 \text{ and } T_r=\frac{\alpha}{\alpha^2-1}$$

$\alpha$ representing the ratio between the rotor resistance and the shunting impedance of the primary circuit, $T_r$ and $T_x$ representing the ratios between the resistance and reactance respectively of the primary circuit as numerator and the shunting impedance of the primary circuit as denominator.

4. An induction tachometer comprising a primary circuit, a secondary circuit, and a rotor operatively connected to said circuits, in which the following relationships exist:

$$\alpha=1; \ T_x=0 \text{ and } T_r=\infty$$

$\alpha$ representing the ratio between the rotor resistance and the shunting impedance of the primary circuit, $T_r$ and $T_x$ representing the ratios between the resistance and reactance respectively of the primary circuit as numerator and the shunting impedance of the primary circuit as denominator.

5. An induction tachometer comprising a primary circuit, a secondary circuit, and a rotor operatively connected to said circuits, in which the following relationships exist:

$$\alpha=1 \text{ and } T_x=0$$

$\alpha$ representing the ratio between the rotor resistance and the shunting impedance of the primary circuit, $T_x$ representing the ratio between the reactance of the primary circuit and the shunting impedance of the primary circuit, in combination with a driving source connected to said primary circuit and having a substantially infinite impedance.

6. An induction tachometer comprising a primary circuit, a secondary circuit, and a rotor operatively connected to said circuits, in which the following relationships exist:

$$\alpha=1 \text{ and } T_x=0$$

$\alpha$ representing the ratio between the rotor resistance and the shunting impedance of the primary circuit, $T_x$ representing the ratio between the reactance of the primary circuit and the shunting impedance of the primary circuit, in combination with a driving source connected to said primary circuit and effective to provide a primary current proportional to the voltage input to said source.

7. An induction tachometer system comprising a primary winding, a secondary winding, and a rotor operatively connected to said windings, in which $\alpha$ represents the ratio between the rotor resistance and the shunting impedance of the primary winding, and in which an impedance is connected with said primary winding, said impedance having a value such, with relation to the values of the resistance and reactance of the primary winding, as to cause the following relationship to exist:

$$(\alpha^2-1)(T_r^2+T_x^2)=\alpha(T_r-\alpha T_x)$$

$T_r$ and $T_x$ representing the ratios between the resistance and reactance respectively of the primary winding as numerator and the shunting impedance of the primary winding as denominator.

8. The system of claim 7, in which $\alpha=1$, $T_r$ therefore equalling $T_x$.

9. The system of claim 8, in which said impedance comprises a resistor connected in series with said primary winding, thereby to increase the value of $T_r$.

10. The system of claim 8, in which said impedance comprises a capacitor connected in series with said primary winding, thereby to decrease the value of $T_x$.

11. The system of claim 7, in which said impedance comprises a resistor connected in series with said primary winding, thereby to increase the value of $T_r$.

12. The system of claim 7, in which said impedance comprises a capacitor connected in series with said primary winding, thereby to decrease the value of $T_x$.

13. An induction tachometer system comprising a primary winding, a secondary winding, and a rotor operatively connected to said windings, in which $\alpha$ represents the ratio between the rotor resistance and the shunting impedance of the primary winding, and in which an impedance is connected with said primary winding, said impedance having a value such, with relation to the values of the resistance and reactance of the primary winding, as to cause the following relationships to exist:

$$T_x=0 \text{ and } T_r=\frac{\alpha}{\alpha^2-1}$$

$T_r$ and $T_x$ representing the ratios between the resistance and reactance respectively of the primary winding as numerator and the shunting impedance of the primary winding as denominator.

14. The system of claim 13, in which said impedance comprises a resistor connected in series with said primary winding, thereby to increase the value of $T_r$.

15. The system of claim 13, in which said impedance comprises a capacitor connected in series with said primary winding, thereby to decrease the value of $T_x$.

16. An induction tachometer system comprising a primary winding, a secondary winding, and a rotor operatively connected to said windings, in which $\alpha$ represents the ratio between the rotor resistance and the shunting impedance of the primary winding, and in which an impedance is connected with said primary winding, said impedance having a value such, with relation to the values of the resistance and reactance of the primary winding, as to cause the following relationships to exist:

$$\alpha = 1 \text{ and } T_x = 0$$

said primary winding being connected to an input circuit, the ratio of the combined resistance of the primary winding and its input circuit to the shunting impedance of the primary winding being substantially infinite in value.

17. The system of claim 16, in which said impedance comprises a capacitor connected in series with said primary winding, thereby to decrease the value of $T_x$.

18. An induction tachometer system comprising a primary winding, a secondary winding, and a rotor operatively connected to said windings, in which $\alpha$ represents the ratio between the rotor resistance and the shunting impedance of the primary winding, and in which an impedance is connected with said primary winding, said impedance having a value such, with relation to the values of the resistance and reactance of the primary winding, as to cause the following relationship to exist:

$$\alpha = 1 \text{ and } T_x = 0$$

said primary winding being connected to a driving source, said source providing a driving current to said primary winding proportional to the voltage input to said driving source.

19. The system of claim 18, in which said impedance comprises a capacitor connected in series with said primary winding, thereby to decrease the value of $T_x$.

References Cited in the file of this patent

UNITED STATES PATENTS

| | | |
|---|---|---|
| 2,507,936 | Schroeder | May 16, 1950 |
| 2,540,614 | Hansell | Feb. 6, 1951 |